United States Patent
Li et al.

(10) Patent No.: US 11,528,585 B2
(45) Date of Patent: Dec. 13, 2022

(54) SCALABLE AND RELIABLE MULTICAST PROTOCOLS

(71) Applicant: Apple Inc., Cupertino, CA (US)

(72) Inventors: Guoqing Li, Campbell, CA (US); Yong Liu, Campbell, CA (US); Jarkko L. Kneckt, Los Gatos, CA (US); Tianyu Wu, Fremont, CA (US); Lawrie Kurian, San Jose, CA (US); Tashbeeb Haque, San Francisco, CA (US); Leor Kehaty, Givataim (IL); Yoel Boger, Shoham (IL); Koby Vainapel, Herzliya (IL)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 17/010,626

(22) Filed: Sep. 2, 2020

(65) Prior Publication Data
US 2021/0076165 A1 Mar. 11, 2021

Related U.S. Application Data

(60) Provisional application No. 62/896,319, filed on Sep. 5, 2019.

(51) Int. Cl.
*H04W 4/06* (2009.01)
*H04W 74/08* (2009.01)
*H04L 1/18* (2006.01)
*H04L 12/18* (2006.01)

(52) U.S. Cl.
CPC ............ *H04W 4/06* (2013.01); *H04L 1/1812* (2013.01); *H04W 74/0816* (2013.01); *H04L 12/189* (2013.01)

(58) Field of Classification Search
CPC ..... H04W 72/0005; H04W 4/06; H04W 8/26; H04W 74/0816; H04L 12/189; H04L 12/185; H04L 1/1812
USPC ........................................................ 370/312
See application file for complete search history.

(56) References Cited

U.S. PATENT DOCUMENTS

| 8,737,281 B2* | 5/2014 | Liu ..................... H04W 72/005 370/312 |
| 10,251,155 B2* | 4/2019 | Gupta ................. H04W 12/041 |
| 2013/0315124 A1* | 11/2013 | Rapaport ............ H04W 72/042 370/312 |
| 2014/0177449 A1* | 6/2014 | Novak ..................... H04W 4/80 370/241 |
| 2016/0113036 A1* | 4/2016 | Stephens .............. H04B 7/0626 370/312 |
| 2019/0036652 A1* | 1/2019 | Baghel .................. H04L 1/1864 |

(Continued)

FOREIGN PATENT DOCUMENTS

| GB | 2585229 A * | 4/2019 | ............ H04W 74/08 |
| WO | WO 2018/144074 A1 * | 8/2018 | ............ H04W 24/10 |

*Primary Examiner* — Peter G Solinsky
*Assistant Examiner* — Sanjay K Dewan
(74) *Attorney, Agent, or Firm* — Kowert, Hood, Munyon, Rankin & Goetzel, P.C.

(57) ABSTRACT

This disclosure relates to transmitting multicast information over a network, such as a wireless local area network (WLAN). A source device may transmit a multicast and a request for feedback to a plurality of sink devices. The sink devices may transmit feedback based on whether they successfully decoded the multicast. The source device may retransmit the multicast (or a portion thereof) based on the feedback.

20 Claims, 9 Drawing Sheets

(56) References Cited

U.S. PATENT DOCUMENTS

2019/0089424 A1* 3/2019 Cariou .................. H04W 74/06
2019/0364588 A1* 11/2019 Lu ......................... H04W 88/08
2020/0112400 A1* 4/2020 Lee .................. H04W 72/0473
2021/0195478 A1* 6/2021 Cariou .................. H04L 5/0053
2021/0321293 A1* 10/2021 Chen .................. H04L 27/2603

* cited by examiner

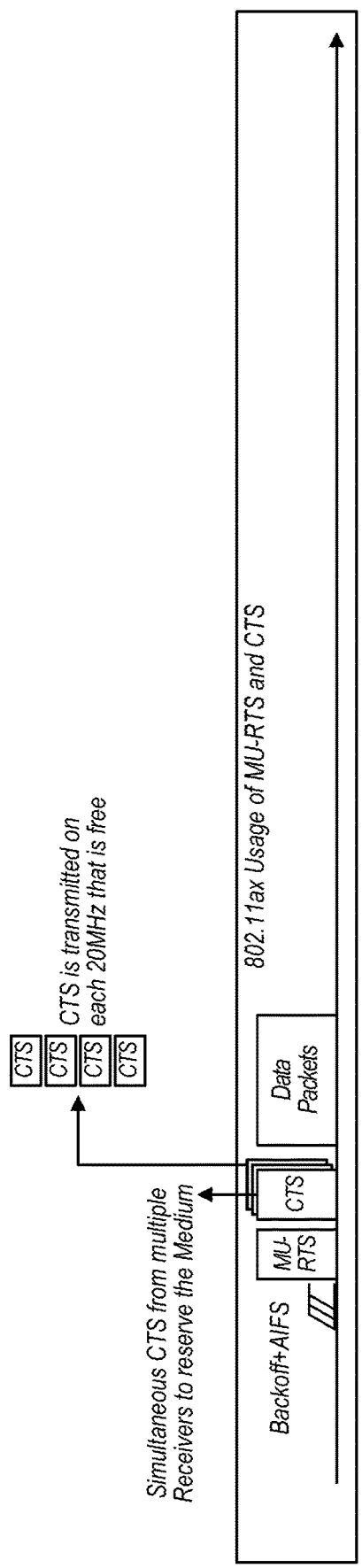
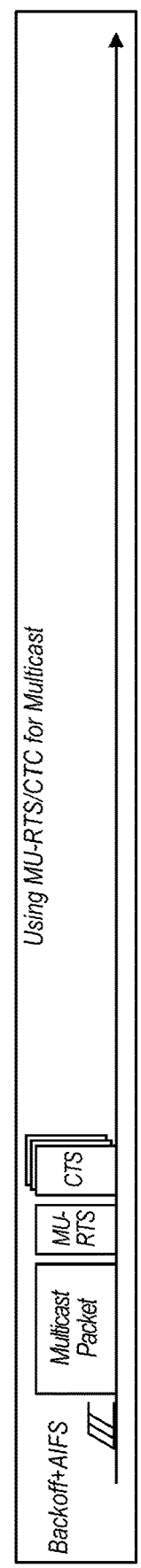
FIG. 9
FIG. 10

SCALABLE AND RELIABLE MULTICAST PROTOCOLS

PRIORITY INFORMATION

This application claims priority to U.S. provisional patent application Ser. No. 62/896,319, entitled "Scalable and Reliable Multicast Protocols," filed Sep. 5, 2019, which is hereby incorporated by reference in its entirety as though fully and completely set forth herein.

TECHNICAL FIELD

The present application relates to wireless communication, including to techniques for multicasting information over a wireless local area network.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Multicasting protocols may be used to disseminate information to a plurality of UEs. However, reliability and/or scalability of existing protocols may be limited. Therefore, improvements in the field are desired.

SUMMARY

Embodiments are presented herein of, inter alia, systems, apparatuses, and methods for multicasting information to a plurality of wireless devices such as user equipment devices (UEs). For example, such multicast information may be transmitted over a wireless local area network (WLAN).

A user equipment device (UE) may comprise an antenna, a radio operably coupled to the antenna, and a processor operably coupled to the radio. The UE may be configured to transmit and/or receive multicast information. An access point device (AP) may comprise an antenna, a radio operably coupled to the antenna, and a processor operably coupled to the radio. The AP may be configured to transmit and/or receive multicast information.

A source wireless device, such as a UE or AP, may be configured to transmit multicast information to a plurality of sink wireless devices (e.g., UEs, APs, etc.) and to request feedback regarding whether the multicast information is received by the sink devices. The request for feedback may be or include one or more of: a null data packet (NDP) feedback report poll (NFRP) (e.g., modified as discussed herein), a multi-user (MU) request to send (RTS) (e.g., modified as discussed herein), and/or a new frame type, among various possibilities.

A sink wireless device, such as a UE or AP, may be configured to receive the multicast information and respond to the request for feedback. To respond to the request for feedback, the sink device may transmit one or more of: an NDP packet or a clear to send (CTS) message, among various possibilities. The response may indicate whether the sink did or did not successfully receive and decode the multicast information.

The source wireless device may receive feedback responses from one or more sinks. Based on the feedback, the source device may determine whether retransmission of any portion of the multicast information is appropriate, and may retransmit accordingly.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 9 is an example timing diagram illustrating multi-user (MU) request to send (RTS) and clear to send (CTS) messages, according to some embodiments;

FIG. 10 is an example timing diagram illustrating using MU-RTS and CTS signaling for multicast, according to some embodiments;

Figure 1:
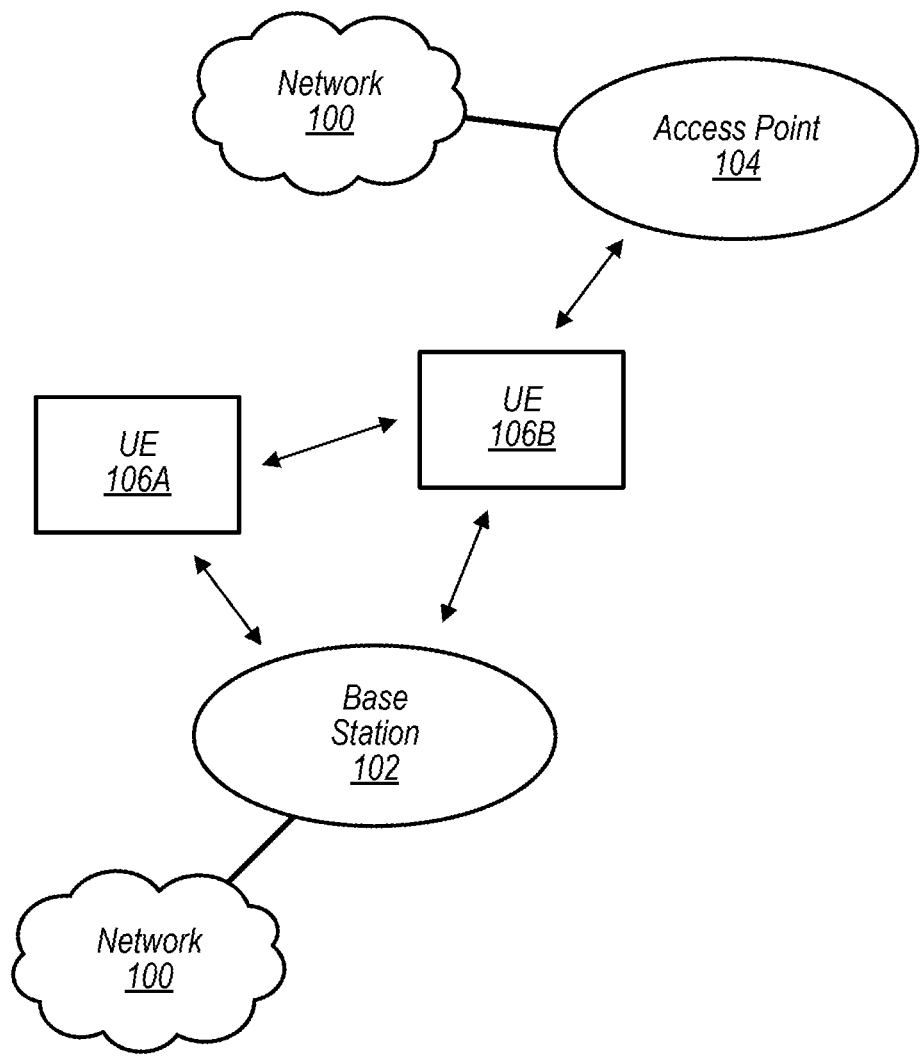
FIG. 1 illustrates an example wireless communication system including a user equipment device (UE), according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIGS. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the example wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, and/or ax, LTE in an unlicensed band (e.g., LAA), a cellular network, a satellite link, or a peer-to-peer relay link.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the example wireless communication system may also include a wireless local area network (WLAN) access point (AP) 104, which may communicate over a transmission medium with the wireless device 106B. The WLAN access point, which may be a Wi-Fi AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. Further, the UE 106A and UE 106B may be capable of performing D2D communication using one or more WLAN standards (e.g., facilitated by AP 104 or independently of AP 104). Additional UEs (not shown) may also be configured to communicate with UEs 106A and 106B.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. Other configurations are also possible.

Figure 2:
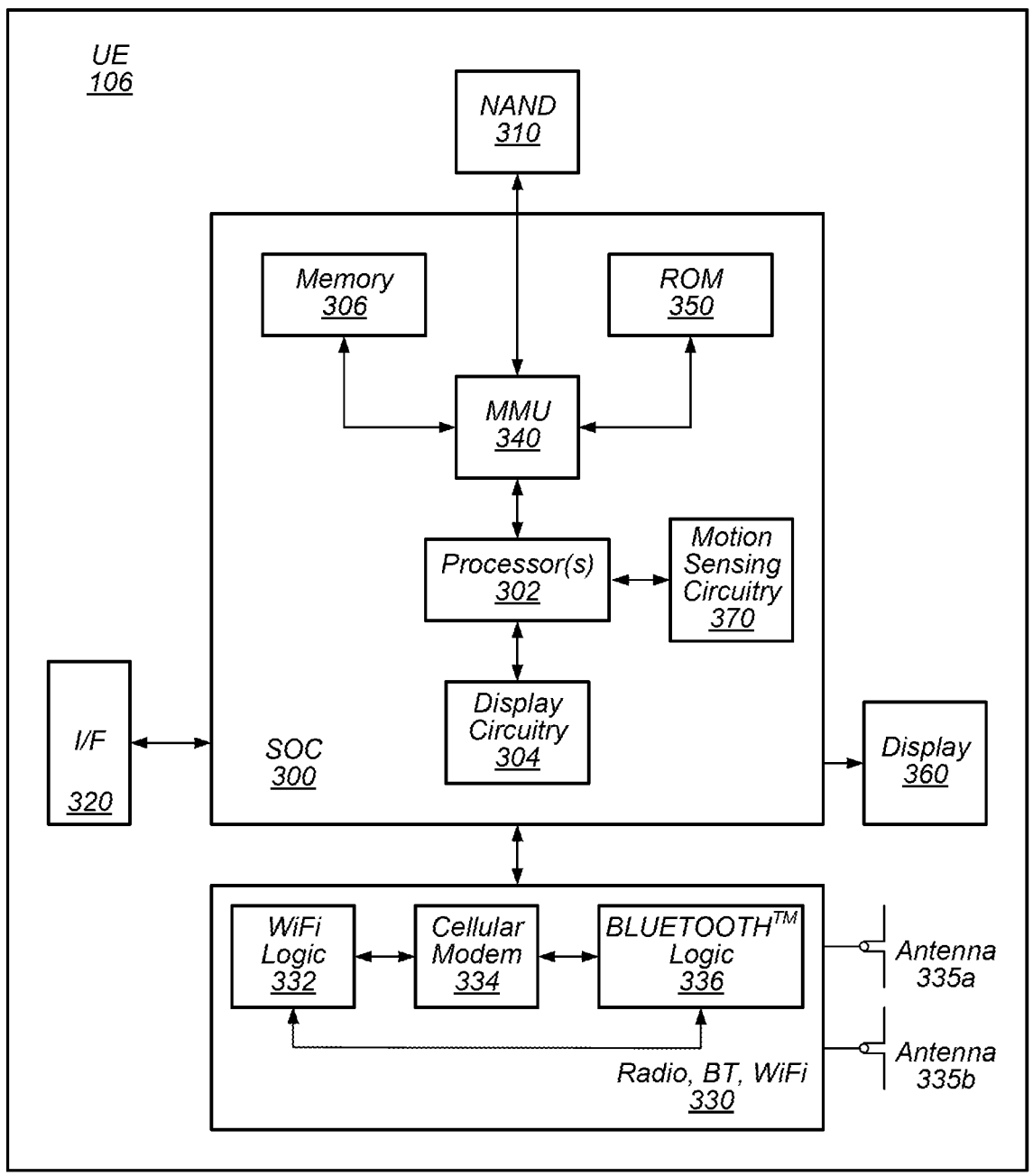
FIG. 2 is a block diagram illustrating an example UE, according to some embodiments.

FIG. 2—Example Block Diagram of a UE Device

FIG. 2 illustrates one possible block diagram of a UE device, such as UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor (s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and, in some embodiments, multiple antennas 335a and 335b, for performing wireless communication with base stations, APs, and/or other devices (e.g., other UEs). For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi or other WLAN communications on an 802.11 network, e.g., according to one or more of various Wi-Fi/WLAN standards such as Institute of Electrical and Electronics Engineers (IEEE) 802.11aa, 802.11ax, 802.11be, etc. The Bluetooth Logic 336 is for enabling the UE device 106 to perform Bluetooth communications. The cellular modem 334 may be a cellular modem capable of performing cellular communication according to one or more cellular communication technologies.

As described herein, UE 106 may include hardware and software components for implementing embodiments of this disclosure. For example, processor 302 and/or one or more components of the wireless communication circuitry 330 (e.g., Wi-Fi logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
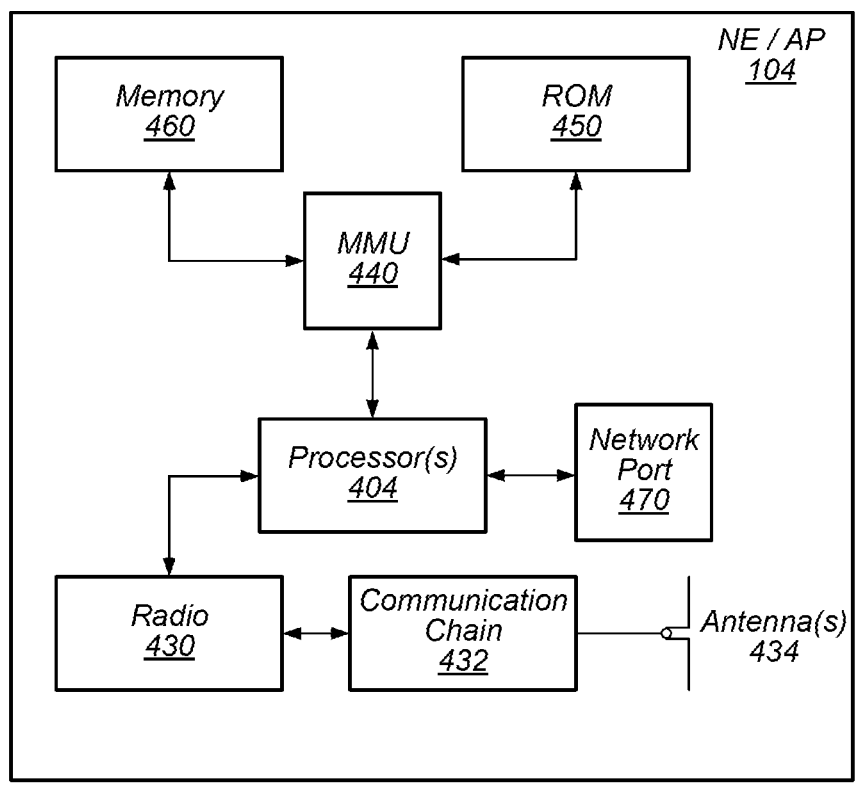
FIG. 3 is a block diagram illustrating an example network element or access point, according to some embodiments.

FIG. 3—Block Diagram of a Network entity (NE) or Access Point (AP)

Figure 4:
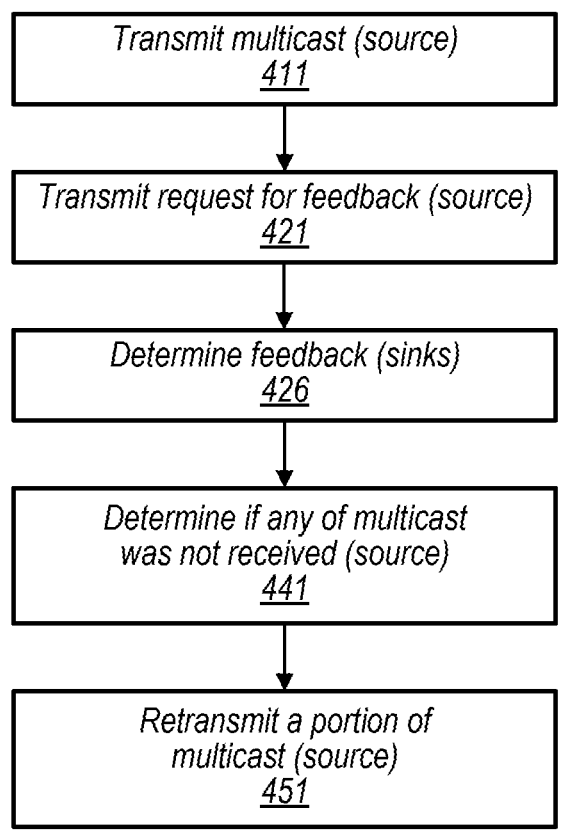
FIG. 4 is a flowchart diagram illustrating an example method for communicating multicast information, e.g., over a wireless local area network (WLAN), according to some embodiments.

FIG. 3 illustrates an example block diagram of a network entity (NE) (e.g., within the network 100) or access point 104, according to some embodiments. It is noted that the network entity of FIG. 4 is merely one example of a possible network entity. As shown, the NE/AP 104 may include processor(s) 404 which may execute program instructions for the network entity/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The network entity/access point 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The network entity 102/access point 104 may include at least one antenna 434, and possibly multiple antennas. The antenna(s) 434 may be configured to operate as a wireless transceiver and may be further configured to communicate with UEs 106 via radio 430. The antenna(s) 434 communicate(s) with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi (e.g., according to one or more of various Wi-Fi/WLAN standards such as 802.11aa, 802.11ax, 802.11be, etc.), etc.

The network entity/access point 104 may be configured to communicate wirelessly using multiple wireless communication standards. In some instances, the base station 102 may include multiple radios, which may enable the network entity to communicate according to multiple wireless communication technologies. For example, as one possibility, the network entity/access point 104 may include an LTE or 5G NR radio for performing communication according to LTE as well as a Wi-Fi radio for performing communication according to Wi-Fi. In such a case, the network entity/access point 104 may be capable of operating as both an LTE base station and a Wi-Fi access point. As another possibility, the network entity/access point 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the network entity/access point 104 may be configured to act exclusively as a Wi-Fi access point, e.g., without cellular communication capability.

As described further subsequently herein, the network entity/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the network entity/AP 104, in conjunction with one or more of the other components 430, 432, 434, 440, 450, 460, 470 may be configured to implement or support implementation of part or all of the features described herein.

FIG. 4—Communicating Multicast Information

Multicasting information, e.g., transmitting information from one (e.g., "source") device to a plurality of (e.g., "sink") devices may be useful in a variety of use cases. For example, such multicasting techniques may be useful for providing content to a group of users (e.g., UEs) in an environment such as a classroom, auditorium, etc. Performance metrics or operational targets for multicasting may include high reliability, high scalability (e.g., efficient use of resources, e.g., high air efficiency), low latency, and/or low error rates (e.g., low packet error rate (PER), etc.). Various existing multicasting techniques may not perform well on one or more of these performance metrics. FIG. 4 illustrates multicasting techniques with improved performance.

In a first embodiment, multicast communication may be converted to unicast, e.g., a group of unicast communications may be used to substitute for a multicast. For example, IEEE standards such as Distribution Management System (DMS) may be used. This approach may provide reliability, but scalability may be limited. For example, if each link is 25 Mbps and with 30 students (e.g., sinks), the network may need to support 750 Mbps goodput which may not be practical today for 2-antenna devices.

In a second embodiment, legacy multicasting protocols may be used. Such protocols may not offer reliability. For example, such protocols may not support acknowledgement (e.g., ACK)/Block ACK or request to send (RTS)/clear to send (CTS) messages, so these protocols may not offer feedback of the multicast transmissions. Further, such protocols may perform at low rates. The low rates may be due to low basic rates and/or inability to use aggregated media access control (MAC) protocol data unit (A-MPDU). Inability to use A-MPDU may lead to very inefficient airtime utilization and may impact overall network performance. Still further, the low efficiency may lead to high latency (e.g., multicast data may be completed with longer latency than regular unicast data).

In a third example, existing reliable multicast protocols in 802.11aa and/or 802.11ax may be used.

Figure 5:
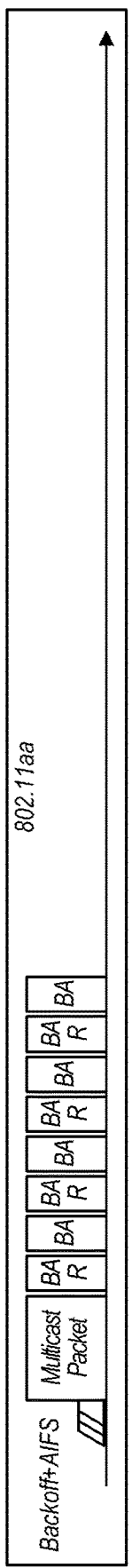
FIGS. 5 and 6 are example timing diagrams illustrating multicast transmission according to 802.11aa and 802.11ax, according to some embodiments.

As further illustrated in FIG. 5, IEEE 802.11aa protocol allows a source device to poll for ACKs in a sequential manner. As shown, after transmitting a multicast packet, the source device may transmit a block ACK (BA) request (BAR) to a first sink device, and may receive a corresponding BA from the first sink device. The source device may proceed to sequentially transmit BARs to the remaining sink devices and receive corresponding BAs from each sink device. Using 802.11aa to poll block ACKs in a sequential manner may not scale well to large numbers of sink devices. With any large number of sinks, the transmission of BARs and BAs for all sinks may consume too much air time for efficient use of resources and may limit throughput.

Figure 6:
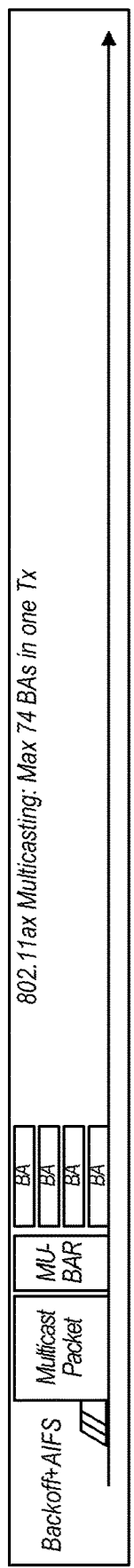

As further illustrated in FIG. 6, IEEE 802.11 (e.g., ax) may enable a source device to poll for ACKs in a parallel manner through uplink (UL) orthogonal frequency division multiple access (OFDMA). As shown, after transmitting a multicast packet, the source device may transmit a multi-user (MU) BAR (MU-BAR) to all sink devices. The sink devices may respond with BAs on different frequencies at the same time. Even though 802.11ax protocol can use MU-BAR to poll for block ACKs in a parallel manner, it may require the source device to support multiple decoders in order to decode these block ACKs. Multiple decoders may be very expensive to implement, and thus this approach may have high complexity and cost. Further, as shown, the 802.11ax approach may be limited to 74 BAs in one transmission, and thus 74 sink devices in one MU-BAR.

FIG. 4 is a flowchart diagram illustrating techniques for scalable, reliable, low complexity multicasting. In order to accommodate many sink devices (e.g., tens, hundreds, or more, according to some embodiments) within short time periods (e.g., tens of microseconds, among various possibilities), two sets of embodiments for large scale multicasting (e.g., greater than 74 sink devices) are provided herein. As described in more detail below, a first set of embodiments includes a re-definition of the 802.11ax transport block (TB) null data packet (NDP) and NDP feedback report poll (NFRP) as a feedback mechanism of multicast reception status, and a second set of embodiments includes a re-definition of the 802.11ax MU-RTS and CTS feature as a negative ACK mechanism to provide feedback for the received multicast packets.

Aspects of the method of FIG. 4 may be implemented by a source wireless device (e.g., UE 106, AP 104, etc.) in communication with a plurality of sink wireless devices (e.g., UEs, APs, etc.), as illustrated in and described with respect to the Figures, or more generally in conjunction with any of the computer circuitry, systems, devices, elements, or components shown in the Figures, among other devices, as desired. For example, a processor (or processors) of a UE (e.g., processor(s) 302, processor(s) associated with communication circuitry 330, 332, 334, 336, etc.) and/or AP (e.g., processor(s) 404, or a processor associated with radio 430 and/or communication chain 432, among various possibilities), or network element (e.g., any component of NGC 606, EPC 600, etc.) may cause the UE and/or AP to perform some or all of the illustrated method elements. For example, a WLAN processor of the UE may cause the UE to perform some or all of the illustrated method elements. Note that while at least some elements of the method are described in a manner relating to the use of communication techniques and/or features associated with IEEE specification documents, such description is not intended to be limiting to the disclosure, and aspects of the method may be used in any suitable wireless communication system (e.g., a cellular system such as 5G), as desired. In various embodiments, some of the elements of the methods shown may be performed concurrently, in a different order than shown, may be substituted for by other method elements, or may be omitted. Additional method elements may also be performed as desired. As shown, the method may operate as follows.

A source wireless device may transmit multicast information to a plurality of sink wireless devices (411), according to some embodiments. The multicast may include any number of multicast packets (e.g., frames, bytes, etc.). The multicast may include application (e.g., payload) data and/or control information.

Each device of the sink wireless devices may or may not receive the multicast. For example, any or all of the sink wireless devices may successfully receive and decode all portions of the multicast. Alternatively, any or all of the sink wireless devices may not successfully receive or decode at least a portion of the multicast. In other words, any combination of the sinks may (or may not) retrieve any or all of the multicast data successfully.

After transmitting the multicast, the source wireless device may transmit a request for feedback associated with the multicast (421), according to some embodiments. In other words, the source device may poll the sink devices to determine whether any of the sink devices did not successfully receive all portions of the multicast. In various embodiments, the request for feedback may request positive or negative acknowledgements.

In some embodiments, the feedback request may include an indication of the multicast transmission for which feedback is requested. For example, an indication of a start and/or end sequence number may be included. The end sequence number may be indicated in various ways, e.g., by a length of the transmission.

In some embodiments, in addition to or instead of a start and end indication, the feedback request may include an indication of specific portions of the multicast for which the source requests feedback. For example, a bitmap of sequence numbers may be included. In other words, the indication may describe a non-sequential set of portions for which feedback is requested. For example, the portions may be separated by one or more gaps.

In response to receiving the request for feedback, a sink wireless device may determine and possibly transmit feedback to the source device (426), according to some embodiments. To do so, the sink wireless device may determine which, if any portions of the multicast that it did not receive. For example, based on the start and end indications (e.g., and/or indication of specific portions), the sink may determine a set of sequence numbers corresponding to the multicast transmission for which the source device requests feedback. The sink may then determine if each portion of the multicast (e.g., each packet with a sequence number in the set of sequence numbers) for which the sink is requesting feedback was received. Based on this determination, the sink may construct and possibly transmit feedback to the source device according to the first or second of embodiments, e.g., as further described below. It will be appreciated that each sink wireless device may independently determine which portions of the multicast were or were not received by the respective sink and independently construct feedback accordingly. In other words, each sink may provide its own, independent feedback to the source.

The source wireless device may monitor for and receive any feedback from the sink devices and may determine whether (e.g., any portion of) the multicast was not received by at least one of the sink devices (441), according to some embodiments. The determination may be based on receiving feedback and/or based on not receiving feedback. In some embodiments, the source wireless device may not determine which (e.g., if any) one(s) of the sink devices did not successfully receive the multicast, and instead may determine whether any sink did not.

The source wireless device may (re)transmit any or all portions of the multicast transmission based on the feedback received (451), according to some embodiments.

For example, if the source determines (e.g., in 441) that all sinks received the complete multicast (e.g., or the portion for which feedback was requested, e.g., as indicated by the start and end indications), then the source may not (re)transmit any portion of the multicast transmission. The source may then proceed with a further transmission (e.g., multicast and/or unicast), or other activity as desired.

Alternatively, if the source determines (e.g., in 441) that at least one sink did not receive at least a portion of the multicast, the source may proceed to (re)transmit all or a portion of the multicast. Such a (re)transmission may be performed as a multicast, e.g., the source may transmit the retransmission to all sinks, e.g., including any sinks which may have previously successfully received the original multicast transmission.

Following a retransmission, the source may perform other actions as desired. For example, the source may transmit a request for feedback on the retransmission (e.g., and potentially other multicast transmissions along with the retransmission).

Figure 7:
FIG. 7 is an example timing diagram illustrating High Efficiency (HE) transport block (TB) feedback according to 802.11ax, according to some embodiments.
Figure 8:
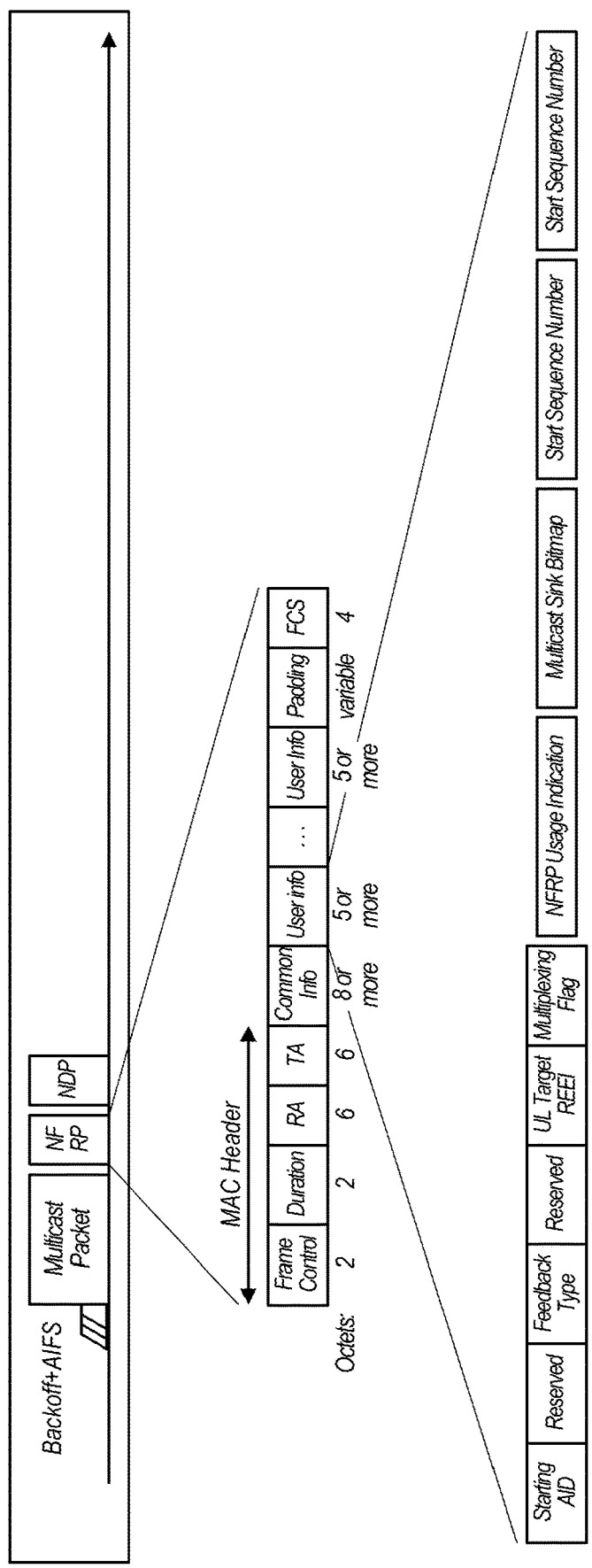
FIG. 8 is an example timing diagram illustrating transmission of multicast information and associated feedback using modified HE TB feedback procedures, according to some embodiments.

FIGS. 7 and 8—First Set of Embodiments

As noted above, the first set of embodiments may include an adjusted or modified NDP feedback process. This set of embodiments may use NDP as a positive acknowledgement of the multicast.

FIG. 7 illustrates an HE TB NDP feedback process as in 802.11ax, e.g., as adapted herein for multicasting according to the first set of embodiments mentioned above. As shown in FIG. 7, after any number of backoff periods and/or arbitration inter-frame spacing (AIFS), the source device may transmit a multicast (e.g., as in 411).

In some embodiments (e.g., of the first set of embodiments), the source may transmit the multicast packets with contiguous sequence numbers.

According to the first set of embodiments, the request for feedback (e.g., in 421) may be or include a NFRP, e.g., modified as described herein. In 802.11ax, NDP feedback is used to allow client devices to feedback buffer status report to AP in order for AP to schedule UL transmissions based on the buffer status of the client devices. 802.11ax defined a special NDP packet called HE TB Feedback NDP which may only have a physical layer (PHY) preamble (header) and may not have any payload. The trigger frame (e.g., the NFRP) is defined to trigger the client devices to send the HE TB NDP packet. Each client device may transmit on a different set of tones in the NDP packet, and collectively all client devices being polled may construct a full PHY preamble (e.g., full set of fast Fourier transform (FFT) tones). Because NDP uses different tones in FFT in the PHY Preamble to provide feedback, it may be very short (e.g., 10 s of microseconds) and may be efficient in collecting feedback. Furthermore, since each client device's feedback may be performed through occupying different set of tones and there is no data in the payload, there may not be a need to implement multiple decoders to process multiple client devices' feedback.

Thus, after transmitting a multicast (e.g., as in 411), the source device may transmit an NFRP (e.g., as in 421) modified for feedback on the multicast. FIG. 8 provides further detail on the structure of the (e.g., modified) NFRP, according to some embodiments. The NFRP may include any or all of the following additions (e.g., relative to the NFRP definition of 802.11ax): an NFRP usage indication, a sink indication, a start indication, and an end indication. The sink indication may be a sink bitmap or other indication of which sinks the source device is polling for multicast reception feedback. The NFRP usage indication may be used to indicate whether the HE TB Feedback NDP packet is used to indicate multicast reception or whether the NDP is used to indicate buffer status. The start indication may be a starting sequence number (e.g., of a first packet of the multicast transmission) or other indication of the beginning of the multicast transmission for which the source requests feedback. The end indication may be: an end sequence number (e.g., of the last multicast packet in the multicast transmission), the number of multicast packets in the transmission (e.g., an AMPDU aggregation size), and/or another indication of the end of the multicast transmission for which the source requests feedback. In other words, the start and end indication may indicate to the sink devices the first and last packets (e.g., frames, etc.) of the multicast transmission, or the portion of the multicast transmission for which the source requests feedback in the present NFRP. As shown in FIG. 8, the added fields may be included in a user information field of the NFRP, among various possibilities (e.g., a common information field and/or other field may be used in addition to or instead of the user field, as desired).

In some embodiments of the first set of embodiments, instead of using a modified version of the NFRP, a new frame type may be used. The new frame type may include a sink indication, a start indication, and an end indication. These indications may operate as described above. Thus, this new frame type may be an alternative means of triggering NDP feedback for a multicast transmission, e.g., without modifying the existing NFRP. Similarly, feedback may be transmitted using other types of signals, e.g., embodiments are not limited to NDP feedback.

In response to the request for feedback (e.g., an NFRP frame or new frame, as explained above), the sink may determine whether it received and successfully decoded all the multicast packets (e.g., as in 426). For example, the sink may consider the multicast transmission as indicated by the request for feedback, e.g., from the beginning sequence number to the end sequence number (e.g., or starting sequence number plus the indicated number of multicast packets) specified in the NFRP (or new) frame. If the sink did receive and decode all of the indicated packets, the sink may transmit an NDP packet or other feedback signal. In other words, the sink may send the NDP or other feedback signal if all multicast packets ranging from start sequence number to the end sequence number have been received. Thus, the NDP or other feedback signal may be a positive acknowledgement (ACK), e.g., indicating that the complete multicast was received. The sink may send the NDP or other feedback signal on the particular tone(s) assigned for its use. In other words, each of the sinks may determine which tone(s) to use for NDP or other feedback signal transmission, e.g., based on information in the NFRP or other control information. For example, NFRP may indicate a set of tones for each user (e.g., sink) being polled.

In some embodiments of the first set of embodiments, because there may be no block ACKs sent from the sinks, no information regarding which packets are received and which are lost is provided to the source. Therefore, the rule for the sink may be to transmit the NDP or other feedback signal when all the multicast packets are received. In other embodiments, the NDP may be modified to include an indication of one or more packets that were not successfully received and/or decoded. Similarly, if another feedback signal is used, the signal may include an indication(s) of one or more portions of the multicast not successfully received and or decoded.

The source may determine whether or not a complete PHY preamble (e.g., a full set of FFT tones) is received in the NDP packet (e.g., in 441), according to some embodiments. If all sinks transmitted (e.g., in 426) their respective NDP on their respective tone(s), then the NDP received by the source may be a complete preamble, e.g., may include a complete set of tones. In other words, the source device may determine whether tones on which NDP is received are a complete set (e.g., whether the received NDP is a complete preamble). Such a complete preamble may be a positive acknowledgement, e.g., an indication that all sinks successfully received the complete multicast (e.g., corresponding to the portions/packets indicated by the start and end indications and any intermediate portions/packets). A similar approach may be used for other types of feedback signals. For example, respective sink devices may transmit feedback signals on respective tones. Similar to an NDP, the source device may determine whether a complete set of tones of the feedback signal is received. Thus, based on a determination that the complete set of tones (e.g., of the NDP or other feedback signal) is received, the source may determine that all sinks received the multicast and may determine that retransmission is not necessary.

The source may retransmit the multicast if a complete NDP is not received (e.g., in 451), according to some embodiments. For example, in response to receiving an NDP with at least one missing tone (e.g., indicating that at least one sink did not positively acknowledge the transmission), the source may retransmit the multicast transmission (e.g., or the portion for which feedback was requested, e.g., as indicated by the start and end indications). Alternatively, if a complete NDP is received, the source may not perform a retransmission.

FIGS. 9-12—Second Set of Embodiments

As noted above, the second set of embodiments may include an adjusted or modified CTS feedback process. This set of embodiments may use CTS as a negative acknowledgement of at least a portion of a multicast (e.g., as transmitted in 411).

The request for feedback (e.g., in 421) may be or include a MU-RTS, e.g., modified as described herein. As illustrated in FIG. 9, in 802.11ax, the MU-RTS/CTS feature allows a first device to send a MU-RTS frame to reserve the medium and multiple receivers may send CTS messages simultaneously to confirm the reservation of the medium. The MU-RTS/CTS operation may be similar to traditional RTS/CTS frames, but targeting point-to-multipoint scenarios. The MU-RTS frame may contain the receiver identifiers who should respond with CTS. The CTS may be duplicated on each 20 MHz channel that is considered free by the receiver(s), and the presence of CTS on each 20 MHz indicates the successful reservation of the 20 MHz channel and thus the first device may use the 20 MHz for the following data transmissions. MU-RTS and CTS frames are sent in regular PHY formats and the first device and receivers may not need special hardware to send/receive MU-RTS and/or send/receive CTS.

Figure 11:
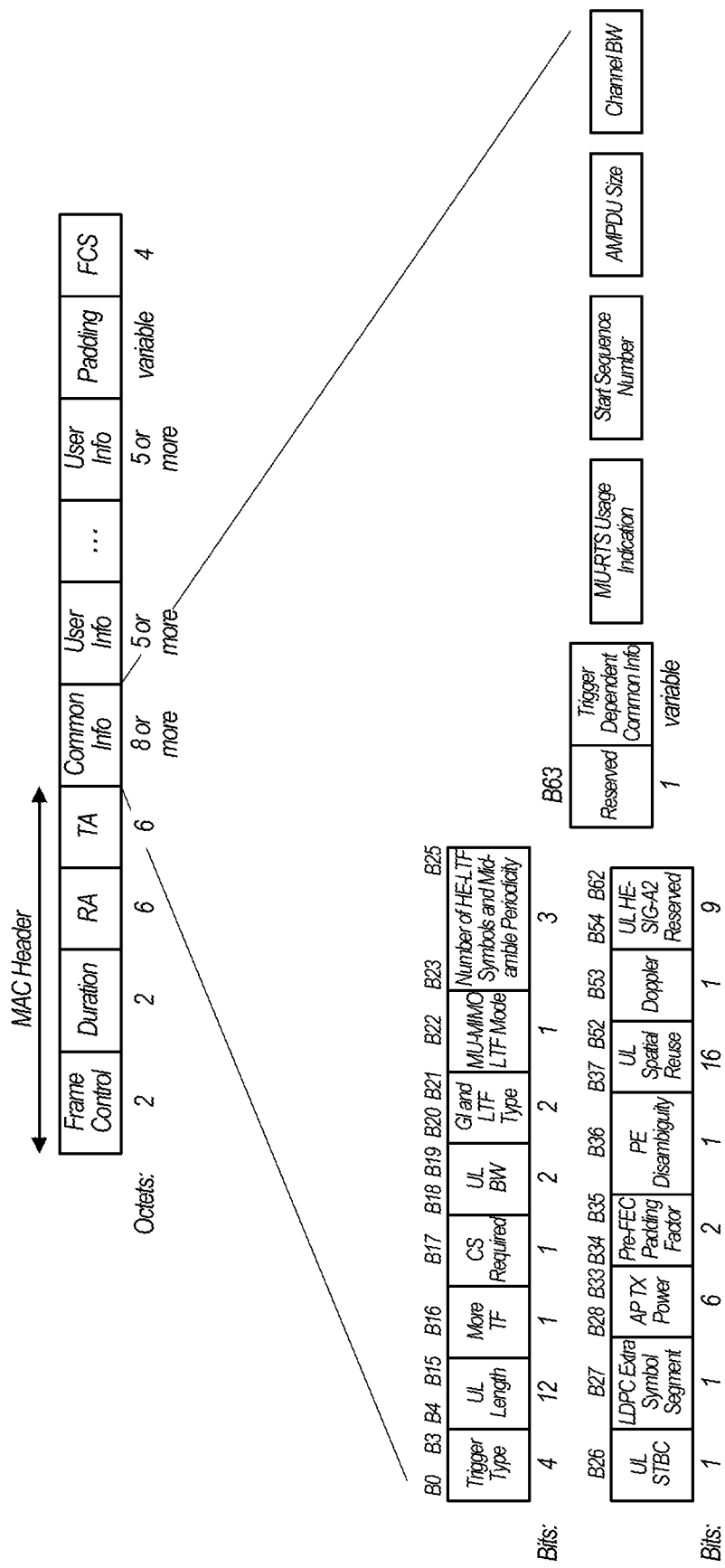
FIG. 11 illustrates an example of a modified MU-RTS frame, according to some embodiments.

As shown in FIG. 10, the MU-RTS and CTS may be adapted for requesting and providing feedback about a multicast transmission. As shown, after any number of backoff periods and/or AIFS, the source device may transmit a multicast (e.g., as in 411). Then, the source device may transmit an MU-RTS (e.g., as in 421). The MU-RTS may be modified as shown in FIG. 11. In some embodiments, any or all of the following new fields may be added to the MU-RTS frame (e.g., in a common information field, as shown, and/or in other fields such as a user information field, among various possibilities). An MU-RTS usage indication may be used to indicate whether the MU-RTS and CTS is used for multicast reception feedback. Start and end indications may be included, e.g., as described above regarding the first set of embodiments. A channel bandwidth indication may be used to calculate the number of CTS messages to be transmitted on the entire bandwidth. For example, if the channel bandwidth is set to 80 MHz, then there may be a total 4 CTS expected (e.g., on each 20 MHz portion of the 80 MHz channel). It will be appreciated that various overall bandwidths and component bandwidths may be used as desired, e.g., the 80 MHz and 20 MHz channel sizes are examples only.

In some embodiments of the second set of embodiments, instead of using a modified version of the MU-RTS, a new frame type may be used. The new frame type may include a start indication, an end indication, and a channel bandwidth indication. These indications may operate as described above. Thus, this new frame type may be an alternative means of triggering CTS feedback for a multicast transmission, e.g., without modifying the existing MU-RTS.

Figure 12:
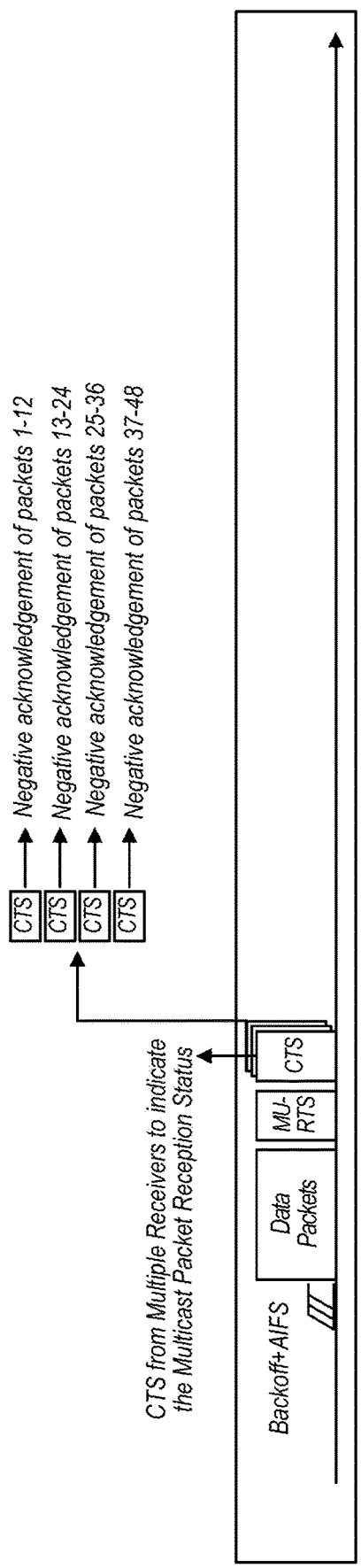
FIG. 12 is an example timing diagram illustrating using MU-RTS and CTS signaling for multicast, according to some embodiments.

In response to the request for feedback, (e.g., a MU-RTS frame or new frame, as explained above), the sink may determine whether it received and successfully decoded all the multicast packets (e.g., in 426). The sink may consider the multicast transmission, e.g., from the beginning sequence number to the end sequence number (e.g., or starting sequence number plus the indicated number of multicast packets) specified in the MU-RTS (or new) frame. The sink may determine to send a CTS to negatively acknowledge any portion of the multicast transmission which was not successfully decoded and may further determine not to send a CTS corresponding to any portion of the multicast transmission which was successfully decoded. As shown in FIG. 12, if the sink did not receive and decode all of the indicated packets, the sink may transmit one or more CTS to indicate which portion(s) of the multicast was not successfully received and/or decoded. Thus, the CTS may be a negative acknowledgement (NACK) for a portion of the multicast transmission, e.g., any one or more packet(s) of a set of multicast packets. The sink UE may determine which portion(s) of the multicast was (were) not successfully received and/or decoded. The sink UE may transmit the CTS on the portion(s) of the bandwidth corresponding to the portion(s) of the transmission that was (were) not successfully decoded. In other words, the presence or absence of potential CTS sent on various different channels (e.g., 20 MHz channels) may indicate the reception status of corresponding different sets of multicast packets. The reception status of multicast packets may be evenly divided among the (e.g., 20 MHz) channels. For example, if the overall channel bandwidth is 80 Mz, then the reception status of all multicast packets may be divided by 4 and potential CTS on each of 4 20 MHz channels may indicate reception status of ¼ of the multicast packets. If all of the ¼ multicast packets are received, then the sink may not transmit the CTS on the corresponding 20 MHz. If any (e.g., one or more) of the ¼ multicast packets are not received and/or decoded successfully, then the sink may transmit the CTS on the corresponding 20 MHz. In other words, each component carrier may correspond to a range of sequence numbers, the sink device may select one (e.g., or more) of the number of component channels based on the sequence number of the packet(s) that was not received. In other words, each portion of the bandwidth may correspond to a portion of the transmission, and the sink device may select one or more of the portions of the bandwidth based on which portion(s) of the transmission were not successfully received. The sink device may transmit a negative acknowledgement (e.g., a CTS or other signal) on the selected portion(s) of bandwidth to indicate to the source device that the portion(s) was not received.

In further detail, as shown in FIG. 12, if the channel bandwidth is 80 MHz (e.g., as indicated in a bandwidth indication of the MU-RTS), then there may be a total of 4 CTS to be potentially transmitted by each respective sink. If there are total of 48 multicast packets transmitted which is indicated in the AMPDU size (e.g., in the start and end indications) in the modified MU-RTS packet, then each CTS may indicate the reception status of 12 contiguous packets. CTS on the first (e.g., or last, etc., any order may be used, as desired) 20 MHz may indicate the (e.g., negative) reception status of one or more of multicast packets 1-12. CTS on the second 20 MHz may indicate the (e.g., negative) reception status of one or more of multicast packets 13-24. CTS on the third 20 MHz may indicate the (e.g., negative) reception status of one or more of multicast packets 25-36. CTS on the fourth 20 MHz may indicate the (e.g., negative) reception status of one or more of multicast packets 37-48.

Thus, the sink device may divide the overall bandwidth (e.g., 80 MHz) by a channel bandwidth (e.g., 20 MHz) to determine a number of component channels (e.g., 4). Further, the sink device may divide the multicast transmission (e.g., the AMPDU size, e.g., the length of multicast transmission portion for which the sink requests feedback) by the number of component channels to determine portions for CTS on each component channel. If the (e.g., number of packets of the) multicast transmission is not divisible by the number of (e.g., 20 MHz) component channels, then the AMPDU size may be rounded up to be a multiple of the total number of component channels and the last the last (e.g., or first) component channel may contain the remaining packet status. In other words, the last (e.g., or first, etc., any order may be used, as desired) 20 MHz may contain (e.g., potential) CTS for the remainder. For example, if there are 47 multicast packets transmitted, then the last 20 MHz may indicate reception status of multicast packets 37-47. The sink device may select a component channel for a CTS based on the sequence number of a packet that was not received in relation to the range of packets corresponding to each component channel.

The source may monitor each (e.g., 20 MHz, e.g., component) channel and determine whether or not any CTS was received on each channel, e.g., to determine whether any multicast data was not received (e.g., in 441), according to some embodiments. In other words, the determination of whether CTS is received may be channel specific. Any CTS received on a particular channel may be a negative acknowledgement for the portion of the multicast transmission corresponding to that channel. Accordingly, the source may make a portion-specific determination of whether any sink did not receive the portion of the multicast. If no CTS is received on a channel, the source may determine that all sinks received the corresponding portion. If no CTS is received at all, the source may determine that all sinks received the complete multicast (e.g., the portion for which feedback is requested, e.g., corresponding to the portions/packets indicated by the start and end indications and any intermediate portions/packets).

It will be appreciated that, in the case of the second set of embodiments, the source may not need to or may choose not to decode the entire CTS on each component channel. Instead, the source may detect the presence or absence of CTS packet transmission through PHY preamble on each component channel to decide if a CTS has been sent on that channel. Thus, the source may base its determination of whether a CTS has been sent on PHY preamble detection.

The source may retransmit a portion of the multicast in response to CTS (e.g., in 451), according to some embodiments. For example, in response to receiving at least one CTS (e.g., indicating a negative acknowledgement), the source may retransmit the portion(s) of the multicast transmission corresponding to the received at least one CTS. Thus, any fraction of the transmission may be retransmitted, e.g., no packets, a specific fraction or fraction of the packets, or all of the packets (e.g., if at least one CTS is received on each of the component channels). In other words, based on detection of the CTS on a particular (e.g., 20 MHz) channel, the source may determine which set of the multicast packets (e.g., or which portion of the multicast transmission) has been lost and may retry the particular set of multicast packets accordingly without retransmitting the entire set of multicast packets. For example, based on a determination that CTS is received on a first channel, the source may determine to retransmit a corresponding first portion and based on a determination that CTS is not received on a second channel, the source may determine to not retransmit a corresponding second portion. Alternatively, if no CTS is received, the source may determine that no retransmission is necessary and may not perform a retransmission.

Additional Information and Examples

It will be appreciated that the first and second sets of embodiments may be used together or separately, according to some embodiments. For example, a source device may determine which approach to use for a given multicast, according to some embodiments. The source may or may not transmit an indication of the selected approach to the sink devices separately from the request for feedback. For example, a source may transmit such an indication in downlink control information such as an RRC configuration. Alternatively, a sink device may be configured to determine the selected approach based on the request for feedback and respond according to the selected approach.

It will be appreciated that regular MU-RTS/CTS and/or regular NFRP may still be used, according to some embodiments. For example, MU-RTS may be used (e.g., using a usage indication field in the modified frame format) to indicate that the sending device is requesting to send further data, according to some embodiments. Similarly, NFRP may be used (e.g., using a usage indication field in the modified frame format) to indicate that the sending device is requesting buffer status information.

In some embodiments of the first set of embodiments, if there is a sequence number gap in the received multicast packets, the sink may not know if a packet is lost or not transmitted at all. In order to avoid such uncertainty, the source may send multicast packets with contiguous sequence numbers and the NFRP (e.g., or new frame) may indicate the starting and end sequence number of the multicast transmissions.

In some embodiments of the first set of embodiments, the source device may process the NDP packet which is a different FFT tone mapping relative to the tone mapping of some other packet types. Therefore, the first set of embodiments may include some additional complexity and hardware support at the source device even though it does not require multiple decoders. In some embodiments, the second set of embodiments may use a different feature (e.g., CTS) to send multicast feedback and may not require additional hardware complexity and may be used on existing devices (e.g., source and/or sink) with only a software upgrade.

The second set of embodiments may consider the following design principles. In some embodiments, there may be a single queue (e.g., in memory space of a source device) allocated for multicast data and there may not be separate queues created for each multicast sink for these multicast packets to maintain low cost. As a result, the multicast transmission or retransmission may be the same for all sinks, e.g., there may be no different multicast retransmission for different sinks even if some packets are lost in some, but not all sinks. Therefore, there may be no need for the source to differentiate which sinks lost the packet if a packet is lost (e.g., by at least one sink). In other words, the source may only determine which (if any packet(s) is (are) lost by any sink(s) and therefore this packet(s) needs to be retransmitted even though some sinks may have already received it (them). Thus, even if the source knows which sink(s) lost the packet(s), it may not do things differently for the sink(s) which did receive the packet vs. the sink(s) which did not, e.g., due to the single queue limitation. Based on the above architecture in most devices and the need to reuse existing hardware to provide multicast reception feedback from the sinks, the MU-RTS/CTS may be modified as described herein.

In some embodiments of the second set of embodiments, the multicast transmission may not be subdivided into portions for purposes of feedback. In other words, a CTS may indicate a negative acknowledgement of any part of the multicast transmission. Accordingly, based on receiving a CTS, the source may retransmit the entire multicast transmission (e.g., corresponding to the start and end indications).

In some embodiments, a user equipment device (UE) may comprise: an antenna; a radio operably coupled to the antenna; and a processor operably coupled to the radio; wherein the antenna, radio, and processor are configured to: receive, from a source device, a first portion of a multicast transmission; receive, from the source device, a request for feedback related to the multicast transmission; determine, based on the request for feedback, that a second portion of the multicast transmission was not received; select, based on the request for feedback, a component channel for indicating a negative acknowledgement of the second portion; and transmit, to the source device on the component channel, the negative acknowledgement of the second portion.

In some embodiments, the request for feedback may comprise a multi-user request to send (MU-RTS).

In some embodiments, the MU-RTS may include a start indication and an end indication, wherein to determine that the second portion was not received, the antenna, radio, and processor are further configured to: determine a set of sequence numbers based at least on the start indication and the end indication; and determine that a packet corresponding to a sequence number of the set of sequence numbers was not received.

In some embodiments, each respective component channel of a number of component channels may correspond to a respective subset of the set of sequence numbers, wherein the component channel for indicating the negative acknowledgement is selected based at least on the respective subset of the set of sequence numbers in comparison to the sequence number.

In some embodiments, the negative acknowledgement may comprise a clear to send (CTS).

In some embodiments, the antenna, radio, and processor may be further configured to determine not to send a CTS associated with the first portion.

In some embodiments, an apparatus for operating a source wireless device, may comprise: a processor configured to cause the source wireless device to: transmit, to a plurality of sink wireless devices, a multicast; transmit, to the plurality of sink wireless devices, a request for feedback associated with the multicast; receive, from first sink wireless devices of the plurality of sink wireless devices, null data packets (NDPs), wherein each of the NDPs are received on different tones; determine whether the tones are a complete set; and based on the determination: when the tones are not a complete set, retransmit the multicast to the plurality of sink wireless devices; or when the tones are a complete set, determine not to retransmit the multicast.

In some embodiments, the request for feedback may comprise a modified NDP feedback report poll (NFRP).

In some embodiments, the modified NFRP may include a usage indication indicating that the modified NFRP requests feedback for the multicast.

In some embodiments, the modified NFRP may include a sink bitmap.

In some embodiments, the modified NFRP may include indications of a start sequence number and an end sequence number.

In some embodiments, the modified NFRP may include at least one field added to a user information field.

In some embodiments, the multicast may include a plurality of packets with contiguous sequence numbers.

In some embodiments, a source wireless device may comprise: an antenna; a radio operably coupled to the antenna; and a processor operably coupled to the radio; wherein the antenna, radio, and processor are configured to: transmit, to a plurality of sink wireless devices, a multicast transmission; transmit, to the plurality of sink wireless devices, a request for feedback associated with the multicast transmission; determine whether any feedback is received; and based on the determination: in response to a determination that feedback is received, retransmit a portion of the multicast transmission; or in response to a determination that no feedback is received, determine not to retransmit a portion of the multicast transmission.

In some embodiments, to determine whether any feedback is received, the antenna, radio, and processor may be further configured to: monitor each of a plurality of channels for feedback; and/or each respective channel of the plurality of channels, make a channel-specific determination of whether any feedback is received on the respective channel.

In some embodiments, in response to a determination that feedback is received on a first channel of the plurality of channels, the antenna, radio, and processor may be further configured to: determine the portion of the multicast transmission corresponding to the first channel.

In some embodiments, in response to a determination that feedback is not received on a second channel of the plurality of channels, the antenna, radio, and processor may be further configured to: determine to not retransmit a second portion of the multicast transmission corresponding to the second channel.

In some embodiments, to determine whether any feedback is received, the antenna, radio, and processor may be further configured to: detect the presence of a clear to send (CTS) without decoding the CTS.

In some embodiments, the request for feedback may comprise a new frame type.

In some embodiments, the request for feedback may comprise a first multi-user request to send (MU-RTS), wherein the antenna, radio, and processor are further configured to transmit a second MU-RTS, wherein a usage indication of the first MU-RTS is different from a usage indication of the second MU-RTS.

In addition to the above-described example embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A device comprising:
   a processor configured to cause a user equipment (UE) to:
      receive, from a source device, a first portion of a multicast transmission;

receive, from the source device, a request for feedback related to the multicast transmission;
determine, based at least on the request for feedback, that a second portion of the multicast transmission was not received;
select, based at least on the request for feedback, a component channel for indicating a negative acknowledgement associated with the second portion; and
transmit, to the source device on the selected component channel, the negative acknowledgement.

2. The device of claim 1, wherein the request for feedback comprises a multi-user request to send (MU-RTS).

3. The device of claim 2, wherein the MU-RTS includes a start indication and an end indication, wherein to determine that the second portion was not received, the processor is further configured to cause the UE to:
determine a set of sequence numbers based at least on the start indication and the end indication; and
determine that a packet corresponding to a sequence number of the set of sequence numbers was not received.

4. The device of claim 1, wherein each respective component channel of a number of component channels corresponds to a respective portion of the multicast transmission, wherein the selected component channel for indicating the negative acknowledgement corresponds to the second portion.

5. The device of claim 1,
wherein the negative acknowledgement comprises a clear to send (CTS).

6. The device of claim 5, wherein the processor is further configured to cause the UE to determine to not send a CTS associated with the first portion of the multicast transmission.

7. An apparatus comprising:
a processor configured to cause a source wireless device to:
transmit, to a plurality of wireless devices, a multicast transmission;
transmit, to the plurality of wireless devices, a request for feedback associated with the multicast transmission;
receive, from first wireless devices of the plurality of wireless devices, respective feedback signals associated with the multicast transmission, wherein the respective feedback signals are associated with different respective devices and are received on different respective tones;
determine whether the different respective tones on which the respective feedback signals are received comprise a complete set; and
in response to a determination that the different respective tones do not comprise a complete set, retransmit the multicast transmission to the plurality of wireless devices.

8. The apparatus of claim 7, wherein the respective feedback signals comprise null data packets (NDPs) and the request for feedback comprises a modified NDP feedback report poll (NFRP).

9. The apparatus of claim 8, wherein the modified NFRP includes a usage indication indicating that the modified NFRP requests feedback for the multicast transmission.

10. The apparatus of claim 8, wherein the modified NFRP includes at least one field added to a user information field.

11. The apparatus of claim 7, wherein the request for feedback indicates a start sequence number and an end sequence number.

12. The apparatus of claim 7, wherein the request for feedback comprises a sink bitmap.

13. The apparatus of claim 7, wherein the multicast transmission comprises a plurality of packets having contiguous sequence numbers.

14. The wireless device of claim 13, wherein the first item of feedback associated with the multicast transmission comprises a clear to send (CTS) message.

15. The wireless device of claim 13, wherein, in response to a determination that an item of feedback is not received on a second channel of the plurality of channels, the processor is further configured to cause the wireless device to:
determine to not retransmit a second portion of the multicast transmission corresponding to the second channel.

16. A wireless device, comprising:
an antenna;
a radio operably coupled to the antenna; and
a processor operably coupled to the radio;
wherein the processor is configured to cause the wireless device to:
transmit, to a plurality of wireless devices, a multicast transmission;
transmit, to the plurality of wireless devices, a request for feedback associated with the multicast transmission;
monitor a plurality of channels for feedback, wherein said monitoring comprises, for respective channels of the plurality of channels, making respective channel-specific determinations of whether an item of feedback is received on the respective channel;
determine that a first item of feedback associated with the multicast transmission is received on a first channel of the plurality of channels; and
in response to the determination that the first item of feedback associated with the multicast transmission is received on the first channel:
select a first portion of the multicast transmission corresponding to the first channel; and
retransmit the first portion of the multicast transmission.

17. The wireless device of claim 16, wherein the processor is further configured to cause the wireless device to:
determine that a second item of feedback associated with the multicast transmission is received on a second channel;
select a second portion of the multicast transmission corresponding to the second channel; and
retransmit the second portion of the multicast transmission.

18. The wireless device of claim 16, wherein to determine that the first item of feedback associated with the multicast transmission is received, the processor is further configured to cause the wireless device to:
detect presence of a clear to send (CTS) message without decoding the CTS.

19. The wireless device of claim 18, wherein the request for feedback comprises a new frame type.

20. The wireless device of claim 16, wherein the request for feedback comprises a first multi-user request to send (MU-RTS), wherein the processor is further configured to cause the wireless device to transmit a second MU-RTS, wherein a usage indication of the first MU-RTS is different from a usage indication of the second MU-RTS.

* * * * *